United States Patent
Park

(10) Patent No.: US 9,605,190 B2
(45) Date of Patent: Mar. 28, 2017

(54) ADHESIVE FOR HYDROPHOBIC OR WATER-REPELLENT SUBSTRATE AND MANUFACTURING METHOD THEREOF

(71) Applicant: KOLON GLOTECH, INC., Gwacheon (KR)

(72) Inventor: Jae-Kuk Park, Yongin (KR)

(73) Assignee: KOLON GLOTECH, INC., Gwacheon (KR)

( * ) Notice: Subject to any disclaimer, the term of this patent is extended or adjusted under 35 U.S.C. 154(b) by 0 days.

(21) Appl. No.: 14/954,790

(22) Filed: Nov. 30, 2015

(65) Prior Publication Data

US 2016/0160100 A1 Jun. 9, 2016

(30) Foreign Application Priority Data

Dec. 3, 2014 (KR) .................. 10-2014-0172094

(51) Int. Cl.
| | | |
|---|---|---|
| *C09J 175/04* | (2006.01) | |
| *C09J 163/00* | (2006.01) | |
| *C09D 163/00* | (2006.01) | |
| *C08G 18/48* | (2006.01) | |
| *C08G 18/58* | (2006.01) | |
| *C08G 18/73* | (2006.01) | |

(52) U.S. Cl.
CPC ........ *C09J 175/04* (2013.01); *C08G 18/4833* (2013.01); *C08G 18/584* (2013.01); *C08G 18/73* (2013.01); *C09D 163/00* (2013.01); *C09J 163/00* (2013.01)

(58) Field of Classification Search
CPC ...................................................... C09J 175/04
See application file for complete search history.

(56) References Cited

U.S. PATENT DOCUMENTS

| | | | | |
|---|---|---|---|---|
| 5,686,541 A | * | 11/1997 | Wang ................... | C08G 18/003 525/407 |
| 5,700,884 A | * | 12/1997 | Kokura ................. | C08G 18/10 525/454 |
| 2005/0147832 A1 | * | 7/2005 | Okai ..................... | C08G 59/4035 428/447 |
| 2010/0326660 A1 | * | 12/2010 | Ballard .............. | C08G 59/5006 166/300 |

FOREIGN PATENT DOCUMENTS

| | | |
|---|---|---|
| JP | 2002-363526 A | 12/2002 |
| JP | 2006-225544 A | 8/2006 |
| JP | 2007-169510 A | 7/2007 |
| JP | 2008-050389 A | 3/2008 |
| JP | 2012-131847 A | 7/2012 |
| KR | 10-2012-0085312 A | 7/2012 |

\* cited by examiner

*Primary Examiner* — Megan McCulley

(57) ABSTRACT

Disclosed is an adhesive composition for hydrophobic or water-repellent substrate comprises an modified epoxy resin, a urethane resin, and a dilution solvent. The adhesive composition according to the present invention can be employed to be adhered the same or different materials or print pattern on a hydrophobic or water-repellent substrate.

11 Claims, No Drawings

ADHESIVE FOR HYDROPHOBIC OR WATER-REPELLENT SUBSTRATE AND MANUFACTURING METHOD THEREOF

CROSS-REFERENCE TO RELATED APPLICATIONS

This application claims priority to and the benefit of Korean Patent Application No. 10-2014-0172094 filed in the Korean Intellectual Property Office on Dec. 3, 2014, the entire contents of which are incorporated herein by reference.

TECHNICAL FIELD

The present invention relates to an adhesive composition for a hydrophobic or water-repellent substrate and a manufacturing method thereof. Specifically, the present invention relates to an adhesive composition and a manufacturing method thereof, which are employed to be adhered the same or different materials or print pattern on a hydrophobic or water-repellent substrate.

BACKGROUND ART

With improvement of living standard and increment of outdoor sports and leisure activities, the demands for high-performance clothes have been increased in a recent year. These clothes require functionalities like a water-proofing, a moisture-permeability, a warm-keeping, and a fast-drying, these functionalities may be used alone or in combination, and thereby the users provide more comfortable feel and sensation. In particularly, breathable and water-proofing fabrics have been widely used in the field of mountain-climbing equipment such as mountain clothes, sleeping bag, caps, and gloves and sports clothes such as outdoor clothes, sweat-suits, ski-suits, and golf-suits. Conventional breathable and water-proofing fabrics were manufactured using polytetra-fluoroethylene (PTFE) film and surface thereof has hydrophobic or water-repellent. With development of worldwide leisure market, hydrophobic polyester fabrics having multi-nano layers have been highlighted as functional cloth materials used in clothes for outdoors or sports. These days, there are increasingly requirements for improving functionality by bonding the same or different materials on hydrophobic or water-repellent fabrics. Also, the needs for embodying various patterns and colors have been increased using screen printing on hydrophobic or water-repellent fabrics.

Meanwhile, it was recently reported that it is very difficult for the same or different materials to be adhered to hydrophobic or water-repellent substrates (for example, hydrophobic fabrics or plastics coated with silicone) using a conventional adhesive. In specifically, surface modification is required for forming 3D patterns using screen printing technique on clothes having hydrophobic or water-repellent, thereby causing complex process.

SUMMARY OF THE INVENTION

The present invention has been made in an effort to provide an adhesive and a manufacturing method thereof, which are employed to be adhered the same or different materials or print pattern on a hydrophobic or water-repellent substrate.

An exemplary embodiment of the present invention provides an adhesive composition for hydrophobic or water-repellent substrate comprising a modified epoxy resin, a urethane resin, and a dilution solvent, wherein the modified epoxy resin having at least one or more isocyanate group, cyanate ester group or oxazolidone ring in its molecule, the weight ratio of the modified epoxy resin and the urethane resin in the composition is 5:5 to 2:8.

Another exemplary embodiment of the present invention provides a method of manufacturing an adhesive composition for hydrophobic or water-repellent substrate comprising the steps of: (a) producing a modified epoxy resin by reacting an epoxy resin having at least one or more hydroxyl group with an isocyanate compound or an amine compound having at least one or more hydroxyl group in the presence of an alcohol, and preparing a modified epoxy resin solution by mixing the modified epoxy resin and a dilution solution; (b) preparing a urethane resin solution by mixing a urethane resin and a dilution solution; and (c) producing a composition by mixing the modified epoxy resin solution and the urethane resin solution for the weight ratio of the modified epoxy resin versus the urethane resin to be 5:5 to 2:8, or producing a composition comprising a reaction product obtained by mixing the modified epoxy resin solution and the urethane resin.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, the present invention will be described in detail with reference to the drawings. In describing the present invention, detailed descriptions related to publicly known functions or configurations will be omitted in order not to obscure the gist of the present invention.

In accordance with one aspect, the present invention provides an adhesive composition capable of bonding the same or different materials or printing patterns on a substrate having a hydrophobic or water-repellent surface. The adhesive according to the present invention is a composition comprising a modified epoxy resin, a urethane resin, and a dilution solvent. Each component of the adhesive composition for the hydrophobic or water-repellent will be described in detail hereinafter.

Modified Epoxy Resin

A modified epoxy resin as a component of the adhesive composition is an epoxy resin having at least one or more isocyanate group, cyanate ester group, or oxazolidone ring. When the modified epoxy resin uses mixed to a urethane resin after-mentioned as certain weight ratio, the adhesive composition shows an excellent coating property, drying property, and adhesion.

The epoxy resin as a raw material of the modified epoxy resin is not particularly limited, and may be bisphenol-A epoxy resin, bisphenol-F epoxy resin, bisphenol-S epoxy resin, phenol novolak resin, cresol novolak epoxy resin, bisphenol-A novolak epoxy resin, bisphenol-F novolak epoxy resin, alicyclic epoxy resin, glycidyl ester epoxy resin, glycidyl amine epoxy resin, hydantoin epoxy resin, isocyanurate epoxy resin, aliphatic chain epoxy resin, and phenoxy resin. These epoxy resins may be halogenated or hydrogenated. In addition, these epoxy resins may be used as one by itself, or combined as at least two or more.

Preferably, the modified epoxy resin is a phenoxy resin having at least one or more isocyanate group, cyanate ester group, or oxazolidone ring. Since the phenoxy resin has a number of hydroxyl groups in its molecule, it can form an isocyanate group, a cyanate ester group, or an oxazolidone ring by reacting with an isocyanate compound or an amino alcohol compound. Also, hydroxyl group of phenoxy resin is combined with a urethane resin after-mentioned, and thereby an adhesive layer is easily formed on a substrate. The phenoxy resin used in the present invention is not particularly limited, and may be bisphenol-A phenoxy resin, bisphenol-A/bisphenol-F phenoxy resin, brominated phenoxy resin, phosphorus-based phenoxy resin, bisphenol-A/bisphenol-S phenoxy resin, caprolactone modified phenoxy resin, siloxane modified phenoxy resin, and so forth. Among these resins, bisphenol-A phenoxy resin is preferable for the eco-friendly, compatibility and curability. The phenoxy resin may be obtained commercially. Examples of the resin include YP-70, YP-50EK35, YP-50, and so forth manufactured by kukdo chemical company (Republic of Korea), YX-4000, YX-8100BH30, YX-6954BH30, and YL-6121H manufactured by Japan epoxy resin company, and PKHH, PKHJ, and PKHP manufactured by InChemInvestment in Chemicals, and so on.

In addition, the modified epoxy resin may be formed by reacting the epoxy resin having at least one or more hydroxyl group like phenoxy resin with an isocyanate compound or an amine compound having at least one or more hydroxyl group.

The Isocyanate group modified epoxy resin or the oxazolidone ring modified epoxy resin according to the present invention will be described in a method of manufacturing an adhesive in detail hereinafter.

Urethane Resin

A urethane resin as a component of the adhesive is a resin formed by polymerizing at least one poly-isocyanate and at least one polyol and has isocyanate group at its terminal A kind of the poly-isocyanate forming the urethane resin according to the present invention is not particularly limited, and may be aliphatic di-isocyanate such as aliphatic poly-isocyanate, cyclo-aliphatic poly-isocyanate, aralipahtic poly-isocyanate, and aromatic poly-isocyanate. Examples of the aliphatic poly-isocyanate may be tri-methylene di-isocyanate, tetra-methylene di-isocyanate, hexa-methylene di-isocyanate, penta-methylene di-isocyanate, 1,2-propylene di-isocyanate, 1,2-butylene di-isocyanate, 2,3-butylene di-isocyanate, 1,3-butylene di-isocyanate, 2,4,4- or 2,2,4-tri-methyl hexa-methylene di-isocyanate, 2,6-di-isocyanate, 2,6-di-isocyanate methyl-caproate, and 1,12-dodeca-methylene di-isocyanate and aliphatic tri-isocyanate such as lysine-ester tri-isocyanate, 1,4,8-tri-isocyanate octane, 1,6,11-tri-isocyanate undecan, 1,8-di-isocyanate-4-isocyanate methyl-octane, 1,3,6-tri-isocyanate hexane, and 2,5,7-tri-methyl-1,8-di-isocyanate-5-isocyanate octane. Also, examples of the cycloaliphatic poly-isocyanate may be 1,3-cyclo-pentene di-isocyanate, 1,4-cyclo-hexane di-isocyanate, 1,3-cyclo-hexane di-isocyanate, 3-isocyanate-methyl-3,5,5-tri-methyl cyclo-hexyl isocyanate (usual name: isophorone di-isocyanate), 4-4'-methylenebis (cyclo-hexyl isocyanate), methyl-2,4-cyclo-hexane di-isocyanate, methyl-2,6-cyclo-hexane di-isocyanate, 1,3- or 1,4-bis (iso-cyanate methyl) cyclo-hexane (usual name: hydrogenated xylene di-isocyanate) or mixture thereof, cycloaliphatic di-isocyanate such as norbornane di-isocyanate and cycloaliphatic tri-isocyanate such as 1,3,5-tri-isocyanate cyclo-hexane, 1,3,5-tri-methyl isocyanate cyclo-hexane, 2-(3-isocyanate propyl)-2,5-di(isocyanate methyl)-bicyclo(2.2.1) heptane, 2-(3-isocyanate propyl)-2,6-di(isocyanate methyl)-bicyclo(2.2.1)heptane, 3-(3-isocyanate propyl)-2,5-di (isocyanate methyl)-bicyclo(2.2.1)heptane, 5-(2-isocyanate ethyl)-2-isocyanate methyl-3-(3-isocyanate propyl)-bicyclo (2.2.1)heptane, 6-(2-isocyanate ethyl)-2-isocyanate methyl-3-(3-isocyanate propyl)-bicyclo(2.2.1)heptane, 5-(2-isocyanate ethyl)-2-isocyanate methyl-2-(3-isocyanate propyl)-bicyclo(2.2.1)heptane, and 6-(2-isocyanate ethyl)-2-isocyanate methyl-2-(3-isocyante propyl)-bicyclo(2.2.1) heptane. Also, the aralipahtic poly-isocyanate may be aromatic di-isocyanate such as 1,3- or 1,4 xylene i-isocyanate or mixture thereof, or ω,ω'-di-isocyanate-1,4-diethyl-bezene, 1,3- or 1,4-bis(1-isocyanate-1-methylethyl)benzene (usual name: tetra-methyl xylene di-isocyanate) or mixture thereof, and aralipahtic tri-isocyanate such as 1,3,5-tri-isocyanate methylbenzene. And, examples of aromatic poly-isocyanate are m-phenylene di-isocyanate, p-phenylene di-isocyanate, 4,4'-di-phenylene di-isocyanate, 1,5-naphthalene di-isocyanate, 2,4'- or 4,4'-di-phenyl methane di-isocyanate or mixture thereof, 2,4- or 2,6-tolylene di-isocyanate or mixture thereof, aromatic di-isocyanate such as 4,4'-toluidine di-isocyanate, 4,4'di-phenyl ether di-isocyanate, aromatic tri-isocyanate such as tri-phenyl methane-4,4',4"-tri-isocyanate, 1,3,5-tri-isocyanate benzene, and 2,4,6-tri-isocyanate toluene, and aromatic tetra-isocyanate such as 4,4'-di-phenyl methane-2,2',5,5'-tetra-isocyanate. These poly-isocyanates may be used alone, or two or more thereof may be used in combination.

The polyol forming the urethane resin is a general term of poly-hydroxy compound, which can be obtained by substituting a number of hydrogen of hydrocarbon with hydroxyl groups. If the polyol is a compound having two or more active hydrogens, its kind is not particularly limited. Specific examples of the polyol are small molecular alcohol such as ethylene glycol, propylene glycol, butadiol, di-ethylene glycol, glycerol, hexane-triol, tri-methylol propane, and pentaerythritol, poly-ether polyol (for example, poly-tetra-methylene glycol, poly-ethylene glycol, poly-propylene glycol, poly-oxi-propylene-diol, poly-oxi-propylene-triol, poly-oxi-butylene glycol, block copolymer between different alkylene-oxide), poly-olefin polyol (for example, poly-butadien polyol and poly-isoprene polyol), poly-tetra methylene oxide glycol (PTMG), adipate polyol, lactone polyol, and polyester polyol. The polyester polyol can be obtained by esterified condensation reaction of acid having two carboxyl groups such as oxalic acid, malonic acid, succinic acid, glutaric acid, adipic acid, maleic acid, fumaric acid, phthalic acid, and terephthalic acid and glycol having two hydroxyl group such as ethylene glycol, propylene glycol, butylene glycol, neophentyl glycol, and hexa-methylene glycol.

Additionally, the urethane resin has been combined with the epoxy resin through the hydroxyl group or the epoxy group in the modified epoxy resin, preferably.

More preferably, the urethane resin has been combined with the modified epoxy resin through the isocyanate group, the cyanate ester group, or the oxazolidone ring in the modified epoxy resin.

Dilution Solvent

A dilution solvent as a component of the adhesive composition controls the viscosity of the adhesive composition to impart proper coating properties to the adhesive composition. The dilution solvent is used as reaction solvent in coupling the modified epoxy resin with the urethane resin. The dilution solvent of the present invention is not particularly limited if it can homogeneously disperse or dissolve the epoxy resin or the urethane resin. For example, the dilution of the present invention may be one or more selected from the group consisting of ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, di-propylene-glycol di-methyl-ether, formic amide, mono formic amide, di-methyl formic amide, mono-ethyl formic amide, di-ethyl formic amide, acetamide, mono-methyl acetamide, N-methyl pyrrolidon, N-ethyl pyrrolidon, N,N-dimethyl formic amide, N,N-dimethyl acetamide, di-methylsulphoxide, di-methyl sulfone, di-methyl sulfone, bis(2-hydroxy sulfone), tetra-methylene sulfone, acetone, methyl-ethyl-ketone, methyl-isopropyl ketone, methyl isoethyl ketone, methyl isobutyl ketone, cyclohexanone, pentane, hexane, dodecane, tetradecane, bezene, tri-methyl bezene, butyl benzoate, dodecyl, xylene, toluene, tetrahydrofuran, 1,4-dioxan, and tetrahydrofuran, 1,3-dioxane, methanol, ethanol, n-propanol, isopropyl alcohol, n-butanol, hexanol, nonanol, cyclo hexanol, benzyl alcohol, 2-methoxy-ethanol, 2-butoxy-ethanol, α-terpinol, benzyl alcohol, 2-hexyldecanol, 3-methoxy propanol, ethylene cellosolve, butyl cellosolve, methyl carbitol, butyl carbitol, hexyl carbitol, methyl acetate, ethyl acetate, ethyl lactate, n-propyl acetate, isopropyl acetate, ethyl propionate, butyl acetate, isobutyl acetate, di-ethyl adipate, di-ethylphthalate, di-ethylene glycol mono-butyl acetate, ethylene glycol mono-methyl ether acetate, ethylene glycol mono-butyl acetate, propylene glycol mono-methyl ether acetate, propylene glycol mono-ethyl-ether acetate, and 3-methoxy propyl acetate.

Content Relation of Component in Composition

The weight ratio of the modified epoxy resin versus the urethane resin in adhesive composition is preferably 5:5 to 2:8. It the weight ratio of the modified epoxy resin versus the urethane resin isn't meet the range, it isn't preferable that at least one of coating property, drying property, and adhesion of the adhesive composition is lowered.

Preferably, the content of the modified epoxy resin in the adhesive composition is ranged from 5 to 25% by weight, and more preferably from 5 to 15% by weight. The content of the urethane resin in the adhesive composition is preferably ranged from 5 to 45% by weight, and more preferably from 10 to 20% by weight.

Other Components

The adhesive composition according to the present invention may further comprises a supplement additives besides the epoxy resin (or the modified epoxy resin), the modified urethane resin, and the dilution solvent. The supplement additives may be selected from antioxidant, sunscreen composition, dispersant, and plasticizer, and so on. The content of the supplement additives is preferably ranged from 0.1 to 5% by weight, and more preferably from 1 to 4% by weight.

In accordance with another aspect, the present invention provides a method of manufacturing an adhesive composition employed to bond the same or different materials or print pattern on a hydrophobic or water-repellent substrate.

According to an exemplary embodiment of the present invention, the method comprises the steps of: preparing a modified epoxy resin solution by mixing the modified epoxy resin having at least one or more isocyanate group, cyanate ester group or oxazolidone ring, and a dilution solution; preparing a urethane resin solution by mixing a urethane resin and a dilution solution; and producing a composition by mixing the modified epoxy resin solution and the urethane resin solution, or producing a composition comprising a reaction product obtained by mixing the modified epoxy resin solution and the urethane resin.

Hereinafter, the method for manufacturing the adhesive for hydrophobic or water-repellent substrate according to a preferable embodiment will be described step by step.

Preparing Modified Epoxy Resin Solution

The step of preparing the modified epoxy resin according to the method for manufacturing the adhesive composition comprises a step of producing a modified epoxy resin by reacting an epoxy resin having at least one or more hydroxyl group with an isocyanate compound or an amine compound having at least one or more hydroxyl group in the presence of an alcohol, and preparing the modified epoxy resin solution by mixing the modified epoxy resin and a dilution solution In this case, the epoxy resin having at least one or more hydroxyl group may be selected from the group consisting of bisphenol-A epoxy resin, bisphenol-F epoxy resin, bisphenol-S epoxy resin, phenol novolak resin, cresol novolak epoxy resin, bisphenol-A novolak epoxy resin, bisphenol-F novolak epoxy resin, alicyclic epoxy resin, glycidyl ester epoxy resin, glycidyl amine epoxy resin, hydantoin epoxy resin, isocyanurate epoxy resin, aliphatic chain epoxy resin, and phenoxy resin, and preferably phenoxy resin. Since the phenoxy resin has a number of hydroxyl groups in its molecule, it can form an isocyanate group, a cyanate ester group, or an oxazolidone ring by reacting with an isocyanate compound or an amino alcohol compound. The phenoxy resin is not particularly limited, and may be bisphenol-A phenoxy resin, bisphenol-A/bisphenol-F phenoxy resin, brominated phenoxy resin, phosphorus-based phenoxy resin, bisphenol-A/bisphenol-S phenoxy resin, caprolactone modified phenoxy resin, siloxane modified phenoxy resin, and so forth. Considering eco-friendly, compatibility, curability, phenoxy resin is preferably bisphenol-A phenoxy resin.

In addition, if isocyanate compound used in manufacturing the modified epoxy resin contains isocyanate group, it is not particularly limited. Preferably, the isocyanate compound may be selected from the group consisting of methane-di-isocyanate, butane-1,1,-di-isocyanate, ethane-1,2,-di-isocyanate, butane-1,2,-di-isocyanate, trans-vinyl-di-isocyanate, heptane-1,7-di-isocyanate, 2,2-dimethyl-pentane-1,5,di-5-isocyanate, hexane-1,6-di-isocyanate, octane-1.8-di-isocyanate-nonane-1,9-di-isocyanate, di-methyl-silane-di-isocyanate, di-phenylsilane-di-isocyanate, cycicohexane-1,4-di-isocyanate, di-cyclo-hexyl-methane-4,4-di-isocyanate, and mixture thereof.

Also, the amine compound having at least one or more hydroxyl group used in manufacturing the modified epoxy resin may be selected from an amino alcohol compound. The amine compound used for manufacturing the modified epoxy resin is not particularly limited, and may be selected from the group consisting of di-methanol-amine, di-ethanol-amine, di-propanol-amine, di-butanol-amine, di-pentanol-amine, di-hexanol-amine, di-heptanol-amine, di-octanol-amine, di-isopropanol-amine, di-isobutanol-amine, di-sec-butanol-amine, N,N-di-methyl-ethanol-amine, 3-di-methyl-amino-1-propanol. 1-di-methyl-amino-2-propanol, 2-(2-amino-ethoxy)-ethanol, N,N-di-methyl-amino-ethyl-N'-methyl ethanol amine, 2-(methyl-amino)-ethanol, 4,6-di-hydroxy-pyrrimidine, 2,4-di-amino-6-hydroxy pyrimidine, 2-phenyl-amino-3-(2-hydroxy ethyl)-oxazolidin, N-(2-hydroxy ethyl)-2-methyl-tetra-hydro-pyrrimidine, N-(2-hydroxy-ethyl)-imidazol, 2,4-bis-(N-methyl-2-hydroxy-ethyl-amino)-6-phenyl-1,3,5-triazine, bis-(di-methyl-aminopropyl), and amino-2-propanol. In the present invention, amine compound having at least one or more hydroxyl group in manufacturing the modified epoxy resin is preferable tertiary amine compound for reaction with the epoxy resin.

The amine compound having the isocyanate compound or at least one or more hydroxyl group is reacted with hydroxyl group of the epoxy resin to form at least one or more isocyanate group, cyanate ester group, or oxazolidone ring in molecules of the epoxy resin. In this case, it is preferable that the epoxy resin is modified in the presence of alcohol. At this time, the alcohol is performed as reaction solvent and preferably, performed to block reaction between the same functional groups or different functional groups such as isocyanate group, cyanate ester group, or oxazolidone ring, which are formed in the epoxy resin. A kind of alcohol used in the modified reaction of the epoxy resin is not particularly limited. For example, the alcohol may be selected from methanol, ethanol, n-propanol, isopropyl alcohol, n-butanol, hexanol, nonanol, cyclo hexanol, benzyl alcohol, 2-methoxy-ethanol, 2-butoxy-ethanol, α-terpinol, benzyl alcohol, 2-hexyldecanol, 3-methoxy propanol, ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, di-propylene-glycol di-methyl-ether, butyl-glycolate, butyl-glycolate, di-acetone alcohol, phenyl carbinol, and methyl-phenyl carbinol. Also, the alcohol used in the modified reaction of the epoxy resin is preferably polyhydric alcohol like ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, and di-propylene-glycol di-methyl-ether.

The reaction for obtaining the modified epoxy resin is performed at a temperature ranging from 40 to 90° C., preferably 45 to 85° C. for about 2 to 24 hours, preferably about 4 to 12 hours.

Preparing Urethane Resin Solution

The step of preparing the urethane resin according to the method for manufacturing the adhesive composition comprises a step of a urethane resin solution by mixing the commercial urethane resin or the modified urethane resin and a dilution solution.

A kind of the poly-isocyanate forming the urethane resin according to the present invention is not particularly limited, and may be aliphatic di-isocyanate such as aliphatic poly-isocyanate, cyclo-aliphatic poly-isocyanate, aralipahtic poly-isocyanate, and aromatic poly-isocyanate. Examples of the aliphatic poly-isocyanate may be tri-methylene di-isocyanate, tetra-methylene di-isocyanate, hexa-methylene di-isocyanate, penta-methylene di-isocyanate, 1,2-propylene di-isocyanate, 1,2-butylene di-isocyanate, 2,3-butylene di-isocyanate, 1,3-butylene di-isocyanate, 2,4,4- or 2,2,4-tri-methyl hexa-methylene di-isocyanate, 2,6-di-isocyanate, 2,6-di-isocyanate methyl-caproate, and 1,12-dodeca-methylene di-isocyanate and aliphatic tri-isocyanate such as lysine-ester tri-isocyanate, 1,4,8-tri-isocyanate octane, 1,6,11-tri-isocyanate undecan, 1,8-di-isocyanate-4-isocyanate methyl-octane, 1,3,6-tri-isocyanate hexane, and 2,5,7-tri-methyl-1,8-di-isocyanate-5-isocyanate octane. Also, examples of the cycloaliphatic poly-isocyanate may be 1,3-cyclo-pentene di-isocyanate, 1,4-cyclo-hexane di-isocyanate, 1,3-cyclo-hexane di-isocyanate, 3-isocyanate-methyl-3,5,5-tri-methyl cyclo-hexyl isocyanate (usual name: isophorone di-isocyanate), 4-4'-methylenebis (cyclo-hexyl isocyanate), methyl-2,4-cyclo-hexane di-isocyanate, methyl-2,6-cyclo-hexane di-isocyanate, 1,3- or 1,4-bis (isocyanate methyl) cyclo-hexane (usual name: hydrogenated xylene di-isocyanate) or mixture thereof, cycloaliphatic di-isocyanate such as norbornane di-isocyanate and cycloaliphatic tri-isocyanate such as 1,3,5-tri-isocyanate cyclo-hexane, 1,3,5-tri-methyl isocyanate cyclo-hexane, 2-(3-isocyanate propyl)-2,5-di(isocyanate methyl)-bicyclo(2.2.1) heptane, 2-(3-isocyanate propyl)-2,6-di(isocyanate methyl)-bicyclo(2.2.1)heptane, 3-(3-isocyanate propyl)-2,5-di (isocyanate methyl)-bicyclo(2.2.1)heptane, 5-(2-isocyanate ethyl)-2-isocyanate methyl-3-(3-isocyanate propyl)-bicyclo (2.2.1)heptane, 6-(2-isocyanate ethyl)-2-isocyanate methyl-3-(3-isocyanate propyl)-bicyclo(2.2.1)heptane, 5-(2-isocyanate ethyl)-2-isocyanate methyl-2-(3-isocyanate propyl)-bicyclo(2.2.1)heptane, and 6-(2-isocyanate ethyl)-2-isocyanate methyl-2-(3-isocyante propyl)-bicyclo(2.2.1) heptane. Also, the aralipahtic poly-isocyanate may be aromatic di-isocyanate such as 1,3- or 1,4 xylene i-isocyanate or mixture thereof, or ω,ω'-di-isocyanate-1,4-diethyl-bezene, 1,3- or 1,4-bis(1-isocyanate-1-methylethyl)benzene (usual name: tetra-methyl xylene di-isocyanate) or mixture thereof, and aralipahtic tri-isocyanate such as 1,3,5-tri-isocyanate methylbenzene. And, examples of aromatic poly-isocyanate are m-phenylene di-isocyanate, p-phenylene di-isocyanate, 4,4'-di-phenylene di-isocyanate, 1,5-naphthalene di-isocyanate, 2,4'- or 4,4'-di-phenyl methane di-isocyanate or mixture thereof, 2,4- or 2,6-tolylene di-isocyanate or mixture thereof, aromatic di-isocyanate such as 4,4'-toluidine di-isocyanate, 4,4'di-phenyl ether di-isocyanate, aromatic tri-isocyanate such as tri-phenyl methane-4,4',4"-tri-isocyanate, 1,3,5-tri-isocyanate benzene, and 2,4,6-tri-isocyanate toluene, and aromatic tetra-isocyanate such as 4,4'-di-phenyl methane-2,2',5,5'-tetra-isocyanate. These poly-isocyanates may be used alone, or two or more thereof may be used in combination.

The polyol forming the urethane resin is a general term of poly-hydroxy compound, which can be obtained by substituting a number of hydrogen of hydrocarbon with hydroxyl groups. If the polyol is a compound having two or more active hydrogens, its kind is not particularly limited. Specific examples of the polyol are small molecular alcohol such as ethylene glycol, propylene glycol, butadiol, di-ethylene glycol, glycerol, hexane-triol, tri-methylol propane, and pentaerythritol, poly-ether polyol (for example, poly-tetramethylene glycol, poly-ethylene glycol, poly-propylene glycol, poly-oxi-propylene-diol, poly-oxi-propylene-triol, poly-oxi-butylene glycol, block copolymer between different alkylene-oxide), poly-olefin polyol (for example, poly-butadien polyol and poly-isoprene polyol), poly-tetra methylene oxide glycol (PTMG), adipate polyol, lactone polyol, and polyester polyol. The polyester polyol can be obtained by esterified condensation reaction of acid having two carboxyl groups such as oxalic acid, malonic acid, succinic acid, glutaric acid, adipic acid, maleic acid, fumaric acid, phthalic acid, and terephthalic acid and glycol having two hydroxyl group such as ethylene glycol, propylene glycol, butylene glycol, neophentyl glycol, and hexa-methylene glycol.

The reaction for obtaining the urethane resin is performed at a temperature ranging from 70 to 100° C., preferably 80 to 90° C. for about 2 to 24 hours, preferably about 2 to 12 hours.

Manufacturing A Composition comprising Modified Epoxy Resin and Urethane Resin

The step of manufacturing the composition comprising modified epoxy resin and urethane resin according to the method for manufacturing the adhesive comprises a step of mixing the modified epoxy resin solution and the urethane resin or forming the reaction product by mixing. In this case, the modified epoxy resin solution and the urethane resin solution are mixed for the weight ratio of the modified epoxy resin versus the urethane resin to be preferably 5:5 to 2:8.

Preferably, the content of the modified epoxy resin in the composition is ranged from 5 to 20% by weight, and more preferably, 5 to15% by weight.

Preferably, the content of the urethane resin in the composition is ranged from 5 to 45% by weight, and more preferably, 10 to 20% by weight.

In the adhesive composition according to the present invention, the modified epoxy resin and the urethane resin may be mixture form, which has been dispersed homogeneously, or preferably mutually coupled. For example, the urethane resin may have been coupled with the modified epoxy resin through the hydroxyl group or the epoxy group in the modified epoxy resin. Also, the urethane resin may have been coupled with the modified epoxy resin through isocyanate group, cyanate ester group, or oxazolidone ring in the modified epoxy resin.

The reaction for coupling the urethane resin with the modified epoxy resin is performed at a temperature ranging from 15 to 100° C., preferably 20 to 90° C., and more preferably 70 to 90° C. for about 2 to 24 hours, preferably about 4 to 12 hours.

Hereinafter, the present invention will be described more concretely through embodiments. However, the embodiments are intended to be exemplary for clarifying technology and do not limit the scope of the invention.

1. Manufacturing Epoxy Resin

EXAMPLE 1

Bis-phenol A and epichlorohydrin were mixed in the molar ratio of 2:3. Sodium hydroxide aqueous solution was added to the mixture, and then condensation reaction was performed at a temperature of 80° C. to form bis-phenol A epoxy resin. Salicylic acid equivalent to 1 mole of the bis-phenol A was dissolved in the ethanol to form salicylic solution. After that, the salicylic solution was added in a beaker in which the bis-phenol A epoxy resin was contained, and reacted at a temperature of 80° C. to form bis-phenol A phenoxy resin. Then, by removing the solvent in the beaker, solid bis-phenol A phenoxy resin was obtained. Then, a bis-phenol A phenoxy resin solution was formed by mixing 35 parts by weight of the solid bis-phenol A phenoxy resin, 45 parts by weight of N-methyl-2-pyrrolidone (NMP), 15 parts by weight of methyl ethyl ketone, and 5 parts by weight of supplement additive.

EXAMPLE 2

Bis-phenol A and epichlorohydrin were mixed in the molar ratio of 2:3. Sodium hydroxide aqueous solution was added to the mixture, and then condensation reaction was performed at a temperature of 80° C. to form bis-phenol A epoxy resin. Salicylic acid equivalent to 1 mole of the bis-phenol A was dissolved in the ethanol to form salicylic solution. After that, the salicylic solution was added in a beaker in which the bis-phenol A epoxy resin was contained, and reacted at a temperature of 80° C. to form bis-phenol A phenoxy resin. N,N-dimethyl-2-amino-ethanol equivalent to 0.5 mole of the bis-phenol A was dissolved in di-propylene glycol with concentration of 20 weight % to form N,N-dimethyl-2-amino ethanol solution. After that, N,N-dimethyl-2-amino ethanol was dropped in a beaker in which the bis-phenol A phenoxy resin was contained, and reacted at a temperature of 50° C. to form the modified epoxy resin having isocyanate group. Then, by removing the solvent in the beaker, solid modified epoxy resin was obtained. Then, a modified epoxy resin solution was formed by mixing 35 parts by weight of the solid modified epoxy resin, 45 parts by weight of N-methyl-2-pyrrolidone (NMP), 15 parts by weight of methyl-ethyl ketone, and 5 parts by weight of supplement additive.

2. Manufacturing Urethane Resin

EXAMPLE 3

11 parts by weight of hexa-methylene di-isocyanate, 100 parts by weight of polyethylene glycol, 60 parts by weight of toluene, and 0.1 parts by weight of methyl-ether hydroquinone were injected and stirred in a reactor. After that, the temperature of the reactor was raised to 85° C. and they were reacted for about 2 hours to form urethane resin. Then, by removing solvent in the reactor, solid urethane resin was obtained. Then, a urethane resin solution was formed by mixing 24.1 parts by weight of the solid modified urethane resin, 10.3 parts by weight of methyl-ethyl ketone, 55.2 parts by weight of cyclohexanone, 4.8 parts by weight of N,N-dimethyl formic amide, 3.4 parts by weight of propylene glycol methyl-ether acetate, and 2.1 parts by weight of supplement additive.

3. Manufacturing Adhesive for Hydrophobic or Water-Repellent Substrate

EXAMPLE 4

The modified epoxy resin solution obtained from Example 2 and the urethane resin solution obtained from Example 3 were added for the weight ratio of the modified epoxy resin versus the urethane resin to be 5:5 in a reactor and stirred at a temperature of about 20° C. for about 4 hours, and thereby the composition was obtained.

EXAMPLE 5

The modified epoxy resin solution obtained from Example 2 and the urethane resin solution obtained from Example 3 were added for the weight ratio of the modified epoxy resin versus the urethane resin to be 2:8 in a reactor and stirred at a temperature of about 20° C. for about 4 hours, and thereby the composition was obtained.

EXAMPLE 6

The modified epoxy resin solution obtained from Example 2 and the urethane resin solution obtained from Example 3 were added for the weight ratio of the modified epoxy resin versus the urethane resin to be 8:2 in a reactor and stirred at a temperature of about 20° C. for about 4 hours, and thereby the composition was obtained.

EXAMPLE 7

The modified epoxy resin solution obtained from Example 2 and the urethane resin solution obtained from Example 3 were added for the weight ratio of the modified epoxy resin versus the urethane resin to be 1:9 in a reactor and stirred at a temperature of about 20° C. for about 4 hours, and thereby the composition was obtained.

EXAMPLE 8

The epoxy resin solution obtained from Example 1 and the urethane resin solution obtained from Example 3 were added for the weight ratio of the epoxy resin versus the urethane resin to be 2:8 in a reactor and stirred at a temperature of about 20° C. for about 4 hours, and thereby the composition was obtained.

4. Testing Properties of Adhesive

The coating property, drying time after coating, and adhesion of the modified epoxy resin solution obtained from Example 2 and the adhesive obtained from Examples 5 to 7 were measured.

(1) Coating Property

The adhesive composition was coated with a thickness of about 6 μm by a bar coater on a water-repellent nylon fabric having contact angle of 135°. The grade of coating property was decided by observing and relatively comparing the degree of homogeneous spread of the adhesive by visible inspection in coating the adhesive using the bar coater as follows:

◎: The Best; ○: Good; Δ: Fair; ×: Poor

The test with respect to hydrophobic nylon fabric having contact angle of 115° was performed in the same way.

(2) Drying Time After Coating

The adhesive composition was coated with a thickness of about 6 μm by a bar coater on a water-repellent nylon fabric having contact angle of 135°. Then, the fabric was dried in an oven at a temperature of 80° C. The drying time of the adhesive was set until the adhesion of adhesive was completely disappeared, and measured.

The test with respect to hydrophobic nylon fabric having contact angle of 115° was performed in the same way.

(3) Adhesion

The adhesive composition was coated with a thickness of about 6 μm by a bar coater on a water-repellent nylon fabric having contact angle of 135°. Then, after the same fabric was put on the adhesive layer and a predetermined pressure was applied, they were sufficiently left and dried. Then, 180° peel shear adhesion strength with respect to the sample, which comprising the lower fabric, the adhesive layer, and the upper fabric, was measured using Instron Universal Testing Machine.

The test with respect to hydrophobic nylon fabric having contact angle of 115° was performed in the same way.

(4) Property Test Result of Adhesive

The results of the adhesive composition tested by using the water-repellent nylon fabric having contact angle of 135° was shown in Table 1. In addition, the results of the adhesive composition tested by using the hydrophobic nylon fabric having contact angle of 115° was shown in Table 2.

TABLE 1

| Classification | Coating | Drying Time After coating (Min) | Adhesion (N) |
| --- | --- | --- | --- |
| Example 2 | Δ | >30 | 2.6~4 |
| Example 4 | ○ | 2~3 | <2 |
| Example 5 | ○ | 2~3 | 5.7~7 |
| Example 6 | ◎ | 2~3 | 7.8~10 |
| Example 7 | ○ | 8~10 | 4~6 |

TABLE 2

| Classification | Coating | Drying Time After coating (Min) | Adhesion (N) |
| --- | --- | --- | --- |
| Example 2 | Δ | >30 | 3~5 |
| Example 4 | ○ | 2~3 | <2 |
| Example 5 | ○ | 2~3 | 8~10 |
| Example 6 | ◎ | 2~3 | 8~11 |
| Example 7 | ○ | 8~10 | 4~6 |

As shown in Tables 1 and 2, when the adhesive composition only comprises the modified epoxy resin having isocyanate group (See Example 2), it was shown that the coating property, drying property, and adhesion were relatively poor. Additionally, when the weight ratio of the modified epoxy resin versus the urethane resin in the adhesive composition is 8:2 (See Example 6), it was shown that the drying property and the adhesion was significantly poor. When the weight ratio of the modified epoxy resin versus the urethane resin in the adhesive composition is 1:9 (See Example 7), it was shown that the coating property and the drying property were a little good, but the adhesion were significantly poor. In addition, when the adhesive composition includes the reaction product of the epoxy resin and the urethane resin (See Example 7), it was shown that the coating property was a little good, but the drying property and the adhesion were poor. On the other hand, when the adhesive composition includes the modified epoxy resin and the urethane resin and the weight ratio of the modified epoxy resin versus the urethane resin in the adhesive composition is 5:5 to 2:8, it was shown that all of the coating property, drying property, and adhesion were good.

According to the present invention, the same or different materials can be adhered or a pattern can be printed on a substrate having hydrophobic or water-repellent surface. For example, it is useful to impart a new functionality or three-dimensional effect on Gore-tex® substrate through various printing or coating techniques such as a screen printing, a gravure coating, and a spray coating. Also, the adhesive according to present invention has excellent coating property and short dry time after coating, thereby can improve workability. Furthermore, there is no need for surface modification with regard to hydrophobic or water-repellent surface of fabrics or plastics, and inherent characteristics of raw materials can be maintained as it is.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An adhesive composition for a hydrophobic or water-repellent substrate, the adhesive composition comprising:
   a reaction product including a modified epoxy resin coupled to a urethane resin, the modified epoxy resin including a functional group comprising any of an isocyanate group, a cyanate ester group, and an oxazolidone ring, the functional group being coupled to the urethane resin; and
   a dilution solvent,
   wherein the weight ratio of the modified epoxy resin to the urethane resin is 5:5 to 2:8.

2. The adhesive composition of claim 1, wherein the modified epoxy resin is a phenoxy resin.

3. The adhesive composition of claim 1, wherein the the modified epoxy resin is about 5 to 20% of the adhesive composition by weight and the urethane resin is about 5 to 45% of the adhesive composition by weight.

4. A method of manufacturing an adhesive composition for hydrophobic or water-repellent substrate, the method comprising:
   producing a modified epoxy resin solution by generating a modified epoxy resin and mixing the modified epoxy resin with a first dilution solution, the modified epoxy resin being generated by reacting an epoxy resin with an isocyanate compound or an amine compound in the presence of an alcohol, each of the epoxy resin, the isocyanate compound, and the amine compound including at least one hydroxyl group, the modified epoxy resin including a functional group comprising any of an isocyanate group, a cyanate ester group, and an oxazolidone ring;
   preparing a urethane resin solution by mixing a urethane resin with a second dilution solution; and
   producing a reaction product by mixing the modified epoxy resin solution and the urethane resin solution, a weight ratio of the modified epoxy resin to the urethane resin being 5:5 to 2:8, the reaction product including the modified epoxy resin coupled to the urethane resin, the functional group of the modified epoxy resin being coupled to the urethane resin.

5. The method of claim 4, wherein the epoxy resin is a phenoxy resin.

6. The method of claim 5, wherein the phenoxy resin is a bisphenol-A phenoxy resin.

7. The method of claim 4, wherein the amine compound is a tertiary amine compound.

8. The method of claim 4, wherein the alcohol is a polyhydric alcohol.

9. The method of claim 4, wherein the modified epoxy resin is about 5 to 20% of the reaction product by weight and the urethane resin is about 5 to 45% of the reaction product by weight.

10. A coated fabric, comprising:
    a fabric substrate, the fabric substrate being hydrophobic, water-repellant, or both; and
    an adhesive coated on the fabric substrate, the adhesive including a reaction product and a dilution solvent, the reaction product including a urethane resin coupled to a functional group of a modified epoxy resin, the functional group including any of an isocyanate group, a cyanate ester group, and an oxazolidone ring.

11. The coated fabric of claim 10, wherein the modified epoxy resin is about 5 to 20% of the reaction product by weight and the urethane resin is about 5 to 45% of the reaction product by weight.

* * * * *